2,819,369

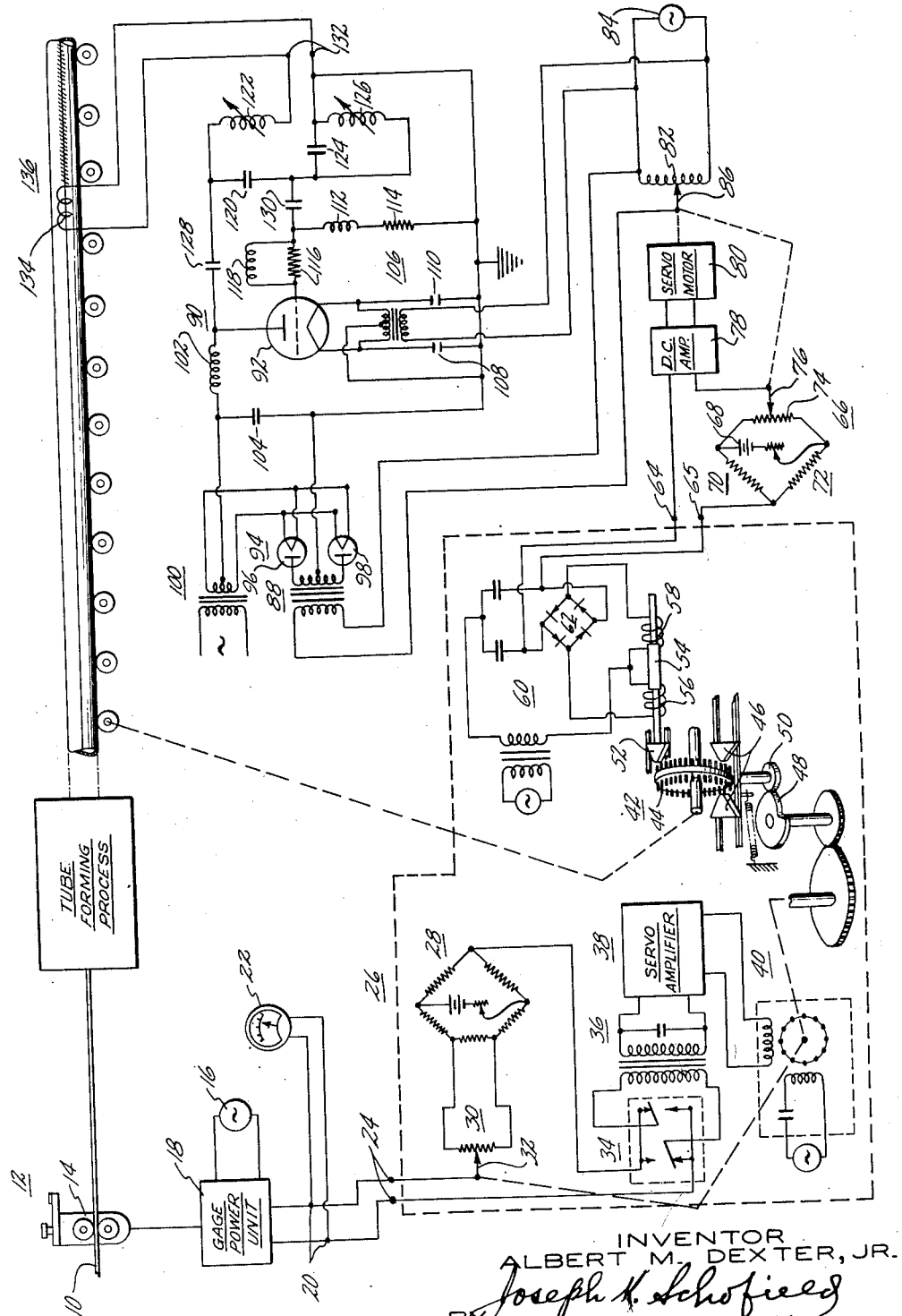

DIMENSION GAGING SYSTEM

Albert M. Dexter, Jr., Farmington, Conn., assignor, by mesne assignments, to Pratt & Whitney Company, Incorporated, West Hartford, Conn., a corporation of Delaware Application April 18, 1955, Serial No. 502,159

4 Claims. (Cl. 219—8.5)

This invention relates to an improved dimension gaging system.

The perennial problem confronting production engineers, since the advent of mass production, is that of continuously exercising corrective control over the production line in the face of increased demands for more production. In one aspect of this overall problem, the engineer is frequently called upon to control a process, despite fairly wide variations in the manufacturing tolerances of the raw ingredients used in fabrication. Further, these controls must be exercised without any stopping of the production line.

For example, in the seam welding of tubular members, the thickness of the material determines in part the amount of welding heat which is required: if the material is oversize more heat is required and conversely. Ideally then, it would be highly advantageous to derive a signal which is a function of the dimension parameter of the material being manufactured, and then deliver this signal to a remote point for the purpose of controlling the process taking place at that remote point. The invention which is about to be described was conceived in solution to this problem of controlling welding heat, but it will be understood that the invention is more general and may be used to control any step in a process, by proper utilization of translating means to convert the error signal received at the locus of the processing station into a control medium or media.

In preferred form the system comprehends a first station and a second station remote from the first station, the material being processed passing continuously through said stations. The first station continuously gages a selected dimensional parameter of the material, the dimensional intelligence being derived as a voltage signal. The resulting signal is applied to the input of an electromechanical memory device, the output of the memory device being an error signal which is delivered to translating means after a predetermined time delay. The translating means then regulate the production in response to the error signal.

Accordingly it is an object of this invention to provide an improved dimension gaging system which will control a process step in a continuous production line, despite variations in critical dimensional parameters of the material being processed.

Another object of this invention is to provide an inexpensive and accurate system for controlling a process step in a continuous production manufacturing operation.

The novel features believed to be characteristic of the invention are set forth with particularity in the appended claims. The invention, itself, however, both as to its organization and method of operation, together with further objects and advantages thereof, may best be understood by reference to the following description when read in connection with the accompanying drawing in which:

The figure is a schematic showing of one illustrative embodiment of the dimension gaging system in accordance with the invention.

Referring now to the drawing, the material 10 is conveyed continuously in sheet form to a first station indicated generally at 12, where it is gaged to determine its thickness dimension. The gage 14 mounted at this station may be of any convenient type having an electrical output. For example, the measuring device may be a beta ray gage such as disclosed in U. S. Patent 2,488,269, Clapp, and U. S. Patent 2,518,115, Bernstein, or it may be of the "Electrolimit" type disclosed in U. S. Patent 2,115,351, Terry et al.

The radiation type of gage such as the beta ray gage cited supra, essentially measures the weight per unit area of a material, but if the material is homogeneous and of uniform density, the weight per unit area is a measure of the thickness. On the other hand, a gage of the "Electrolimit" type cited supra, measures the thickness directly. However, it should be made clear at this point, that the invention is not limited to utilization with a particular gage, but in fact may be employed with any gage whose output is an electrical equivalent of the variable being measured. Accordingly, to avoid confusion in the specification and in the appended claims, the term "thickness" will be understood to include weight per unit area, in addition to the thickness as generally understood.

In the practical embodiment here described, member 14 is of the "Electrolimit" type disclosed in U. S. Patent 2,115,351 to Terry et al. The gage is energized by an alternating current source 16 which is supplied to a power unit 18. An alternating signal is derived which is a function of the thickness of the sheet material being gaged at that instant; the alternating signal is then rectified and appears as a D. C. output at terminals 20, from whence it is applied to material thickness indicator 22, and to the input terminals 24 of the synchronizing or electromechanical memory device indicated generally at 26.

For a more complete and detailed description of the synchronizing device 26 reference may be had to the copending application of Albert M. Dexter, Jr. for an Electromechanical Memory or Synchronizing Device, Serial No. 484,796, filed January 28, 1955. A bridge circuit is shown generally at 28. The bridge is energized by a suitable D. C. source, the bridge arms being pure resistances. A potentiometer indicated generally at 30 is connected in parallel with a portion of the resistance of one arm. The potentiometer 30 has a slide wire arm 32 for selecting or proportionally dividing the voltage magnitude appearing across the portion of the bridge resistor with which it is in parallel. The slide wire arm 32 is electrically connected to one of the input terminals 24 of the memory device 26.

The output of the bridge potentiometer is fed as a D. C. signal to a converter means indicated generally at 34. In this embodiment the means 34 is of the type known in the art as a synchronous inverter or chopper having periodically make and break contacts. The resulting A. C. output from the converter means 34 is fed to the primary of a transformer 36 the secondary of which is shunted by a condenser. The A. C. output of the transformer is fed to a servoamplifier 38 which is electrically connected on its output end to a balancing or servo motor 40. The balancing motor here utilized is of the type well-known in the art as a two phase induction motor. The shaft of motor 40 is suitably coupled to the slide wire arm 32 so that angular positions of the motor shaft produce complementary translational displacement of the slide wire arm 32.

A mechanical time delay mechanism 42 is shown diagrammatically, and may be similar to that shown and described in the U. S. patent to Ladrach 2,217,342, granted October 8, 1940. In this type of delay mechanism, a drum is caused to rotate on a shaft which is coupled to the continuous production line at a predetermined speed rate, by any suitable means such as a gear train or the like. A series of storage or pin members 44 are inserted around the periphery of the drum, parallel to the drum shaft axis, and are adapted for axial displacement therein. The pins 44 are actuated by wedge members 46 which are mounted on a table or base so as to permit transverse displacement along tracks or runners. The wedge members are displaced along the tracks through the agency of a linear cam and follower, 48 and 50 respectively. As may be seen from a study of the drawing, the table on which the wedge members 46 rest is suitably biased, such as by means of a spring for example, so that the follower 50 is constrained to follow the eccentricity of the cam surface. The cam 48 is coupled to the shaft of servo motor 40 in any suitable manner such as with spur gears for example. A slave or follower wedge member 52 is adapted for lateral movement on tracks, near the upper edges of the drum, and includes a longitudinal portion or shaft upon which is mounted a mass of magnetic material 54, arranged for displacement within the cores of coils 56, 58. An impedance bridge 60 is operatively associated with the wedge follower 52, two of the bridge arms containing condensers, the other two arms including inductance coils 56, 58. A ring rectifier indicated generally at 62 is electrically connected to the arms of bridge 60 so as to provide only a D. C. output signal at terminals 64, 65 of the memory device 26, the A. C. component of the signal being effectively rectified.

A D. C. resistance bridge is shown at 66. The bridge is energized by a D. C. source 68, and includes resistances 70, 72 in two of its arms. The other two arms are provided by a potentiometer 74 having a slide wire arm 76 adapted for sliding displacement so as to change the ohmic magnitude of the respective arms.

One of the output terminals of the electromechanical memory 26 is connected to a D. C. amplifier 78, while the other output terminal is connected to a diagonal corner of the bridge 66. The amplified signal from the amplifier 78 is fed to a servo motor 80.

A variable autotransformer is indicated generally at 82. Energy for the autotransformer is provided by an A. C. source 84. The output of the transformer 82 is taken between one end of the winding and a slide wire arm 86, and applied to an input transformer indicated generally at 88.

The slide wire arms 76 and 86 are mechanically coupled respectively to the shaft of motor 80.

An oscillator of the tuned plate-tuned grid type, is indicated generally at 90, and includes a triode 92. The plate potential of triode 92 is provided by transformer 88 and rectifier 94. The rectifier 94 is connected to the secondary of transformer 88, and consists of diodes 96 and 98. A transformer 100 supplies the heater current for the cathodes of diodes 96, 98. The rectified potential is supplied to the triode plate through the plate choke 102. A plate by-pass condenser 104 is connected across the output of the rectifier 94.

The cathode of tube 92 is directly heated by a transformer 106. The primary of transformer 106 is energized by source 84. The secondary of the transformer 106 is connected to the cathode, and is by-passed to ground through the dual filament by-pass condensers 108, 110. A midtrap on the secondary is returned to ground.

The grid circuit of triode 92 includes grid choke and grid resistors 112 and 114 respectively, and parasitic suppressor resistor 116 shunted by parasitic suppressor inductance 118. The tuned plate circuit comprises capacitor 120 and variable inductor 122. The tuned grid circuit includes condenser 124 and variable inductor 126. The plate of the triode 92 is connected to the tuned plate circuit through plate blocking condenser 128. The grid is similarly connected to the tuned plate-tuned grid circuits by means of grid blocking capacitor 130. The output of the oscillator 90 appears at terminals 132 from whence it is applied to the work or inductance coils 134.

In explanation of the operation of the apparatus here described, let us first consider the situation where the material being continuously fed through the production line is of the desired or nominal thickness. The tuned plate and tuned grid circuits have been properly adjusted so as to produce the desired high frequency at the welding station 136. The plate potential is of such magnitude that the heat developed at welding station 136 is such as to produce a weld of optimum penetration and strength. The auto-transformer 82 has its slide wire arm 86 set to tap off a definite potential, which when rectified supplies this predetermined plate potential.

Under these conditions, the norm D. C. input voltage, which is obtained from station No. 1 (as a function of the thickness dimension), is applied to input-terminals 24 of the electromechanical memory device 26. This norm D. C. voltage does not upset the balance of the bridge-potentiometer combination 28, 30, and hence the input to the converter 34 is zero. The servo motor 40 remains quiescent, and no error signal is therefore developed at terminals 64, 65. There is, of course, no input to the D. C. amplifier 78 so that the setting of slide wire arm 76 is undisturbed.

Next, let us assume that the thickness of the material 10 passing through station No. 1 has departed from the standard in the sense that its thickness is either undersize or oversize. In either of these situations a change in welding heat is required—that is less heat is required for the undersize condition and more heat is required for the oversize condition. In either case the input to the memory 26 causes an unbalance in the bridge 28, so that an incremental D. C. voltage is supplied to the converter means 34. After conversion to A. C., the signal is applied to the transformer 36 and then to the servo amplifier 38, from whence an error voltage is applied to the motor 40.

The application of this error voltage creates a torque which causes motor 40 to rotate in such direction as to correct for the error, that is, the motor shaft experiences a rotation of such magnitude and direction as to restore balance to the bridge potentiometer combination 28, 30, by moving the slide wire arm to a new setting, thus offsetting or cancelling the original signal from the bridge potentiometer combination 28, 30. The nature of the error, whether for an oversize or undersize condition, determines the direction of rotation of motor 40.

The magnitude of the angular displacement of the motor 40 is a function of the thickness error, and this displacement, through suitable coupling, is translated into a displacement of cam 48. The follower 50 complements this latter movement, and causes wedge members 46 to move axially along the tracks so as to displace pins 44 axially in response to the movement of linear cam 48. The information of the change in reading at station No. 1 has now been resolved into varied axial displacements of storage or pin members 44. This information is now stored, and the drum continues to rotate in predetermined speed relationship with that of the process production line. When the displaced pins reach wedge follower 52, the material, which was gaged at station No. 1, has now been formed into tubular shape, and is now at the welding station 136. At this instant, the displaced pins move follower wedge means 52 laterally, and the magnetic mass 54 is accordingly correspondingly moved. The change in reluctance of the cores of coils 56, 58 causes a change in their respective inductances, so that the change in impedance of the bridge arms is reflected in the D. C. error output appearing at terminals 64, 65. The error signal passes through the arms of bridge 66, and is applied as an input error voltage to the D. C. amplifier 78, and thence to the servo motor 80. The resulting change in shaft position of the motor 80 is translated into displacements of slide wire arms 86 and 76 respectively—slide wire arm 86 is moved in such direction as to provide the corrective plate potential to give the desired welding heat, and slide wire arm 76 is moved in the direction which will reduce the error input to amplifier 78 to zero. This is accomplished by moving slide wire arm 76 until it is at the same potential as the terminal 64. If the error in thickness of the material 10 continues in the same magnitude and same sense, the bridge 66 will continue to maintain a signal of zero potential at the input of amplifier 78. The slide wire arm 86 will thus remain at its then setting, so that the proper corrective welding heat obtains. Should the material return to nominal size, zero voltage would appear at terminals 64, 65. However, the previous setting of slide arm 76 would result in a signal input to amplifier 78. The net result would be a rotation of the shaft of motor 80, so as to restore the status quo by returning slide wire arms 76 and 86 to their nominal settings.

While certain specific embodiments have been shown and described, it will, of course, be understood that various other modifications may be devised, by those skilled in the art, which will embody the principles found in the true spirit and scope of the invention which is defined in the appended claims.

I claim as my invention:

1. A system of the type described for utilization in processing a material in continuous production, comprising in combination, a first station, a second station remote from said first station, the material being processed passing continuously past said stations, the first station continuously gaging a dimensional parameter of the material, the dimensional intelligence being derived as a voltage signal, an electromechanical memory device having an input and an output, said voltage signal being applied to the memory input, electro-thermal transducer means at said second station, said memory device delivering its output as an error signal to said electro-thermal transducer means after a predetermined time delay, whereby the thermal output of the transducer is a function of said dimensional parameter.

2. A system of the type described for utilization in processing a material in continuous production, comprising in combination, a first station, a second station remote from said first station, the material being processed passing continuously through said stations, the first station continuously gaging the thickness of the material, the thickness intelligence being derived as a voltage signal, an electromechanical memory device having an input and an output, said voltage signal being applied to the memory input, said memory device delivering its output after a predetermined time delay, an oscillator for delivering power in the form of heat at the second station, a power source for said oscillator, and a closed loop system intermediate said memory output and said power source for controlling the magnitude of the power supplied to the oscillator by said source in response to variations in the memory output, whereby the thermal power delivered at the second station is a function of the thickness of the material.

3. A system of the type described for utilization in processing a material in continuous production, comprising in combination, a first station, a second station remote from said first station, the material being processed passing continuously through said stations, the first station continuously gaging the thickness of the material, the thickness intelligence being derived as a voltage signal, an electromechanical memory device having an input and an output, said voltage signal being applied to the memory input, said memory device delivering its output after a predetermined time delay, an oscillator for delivering power in the form of heat at the second station, a power source for said oscillator, said source comprising an autotransformer having an adjustable secondary tap, a bridge circuit having two arms adjustable by a slide wire arm and including a corner diagonally opposite said wire arm, an amplifier, a servo motor electrically connected to the amplifier and including a shaft, the bridge circuit being electrically intermediate the memory device and the amplifier, said diagonal corner being connected to one of the memory output terminals, the bridge slide wire arm being connected to one terminal of the amplifier input, the motor shaft being operatively coupled to the adjustable secondary tap and to the bridge slide wire arm, whereby the thermal power delivered at the second station is a function of the thickness of the material.

4. A system of the type described for utilization in a continuous process for induction welding a material, comprising in combination, a first station, a welding station remote from said first station, the material to be welded passing continuously through said stations, the first station continuously gaging the thickness of the material, the thickness data being derived as a voltage signal, an electromechanical memory device having an input and an output, said voltage signal being applied to the memory input, said memory device delivering its output as an error signal after a predetermined time delay, an oscillator generator including a vacuum triode, for delivering welding heat at the second station, a power source for said oscillator, and a closed loop system intermediate said memory output and said power source for controlling the magnitude of the power supplied to the plate of said triode in response to said error signal, whereby the welding heat at the second station is a function of the thickness of the material.

References Cited in the file of this patent
UNITED STATES PATENTS

| | | |
|---|---|---|
| 2,236,998 | Gillette | Apr. 1, 1941 |
| 2,323,349 | Odquist | July 6, 1943 |
| 2,467,782 | Schuman | Apr. 1, 1949 |
| 2,473,188 | Albin | June 14, 1949 |
| 2,610,288 | Cage | Sept. 9, 1952 |